(12) United States Patent
Ali et al.

(10) Patent No.: US 8,192,312 B2
(45) Date of Patent: Jun. 5, 2012

(54) ISOLATOR WITH DAMPING

(75) Inventors: Imtiaz Ali, Lathrup Village, MI (US); Matthew Kramp, Canton, MI (US); Alexander Serkh, Troy, MI (US)

(73) Assignee: The Gates Corporation, Denver, CO (US)

( * ) Notice: Subject to any disclaimer, the term of this patent is extended or adjusted under 35 U.S.C. 154(b) by 1147 days.

(21) Appl. No.: 12/012,150

(22) Filed: Jan. 31, 2008

(65) Prior Publication Data
US 2009/0194380 A1   Aug. 6, 2009

(51) Int. Cl.
*F16D 3/00* (2006.01)
*F16H 55/36* (2006.01)

(52) U.S. Cl. ........................................... 474/94

(58) Field of Classification Search .............. 474/94
See application file for complete search history.

(56) References Cited

U.S. PATENT DOCUMENTS

| | | | |
|---|---|---|---|
| 3,968,702 A | 7/1976 | Beaudoin et al. | 74/230.17 |
| 4,095,479 A | 6/1978 | Lundberg | 74/230.17 |
| 4,102,214 A | 7/1978 | Hoff | 74/230.17 |
| 4,943,264 A | 7/1990 | Whiteman, Jr. | 474/13 |
| 5,052,981 A | 10/1991 | Robert | 474/14 |
| 5,149,309 A | 9/1992 | Guimbretiere | 475/234 |
| 5,326,330 A | 7/1994 | Bostelmann | 474/13 |
| 7,007,780 B2 | 3/2006 | Arnold et al. | 192/21 |
| 2006/0154763 A1* | 7/2006 | Serkh | 474/59 |
| 2008/0280709 A1* | 11/2008 | Gouadec | 474/94 |
| 2008/0312014 A1* | 12/2008 | Stief et al. | 474/94 |

FOREIGN PATENT DOCUMENTS

| | | |
|---|---|---|
| KR | 20-0267231 | 3/2002 |
| WO | 2005/057037 A1 | 6/2005 |
| WO | WO 2006025166 A1 * | 3/2006 |
| WO | WO 2007065868 A1 * | 6/2007 |

* cited by examiner

*Primary Examiner* — William E Dondero
(74) *Attorney, Agent, or Firm* — J. A. Thurnau, Esq.; T. A. Dougherty, Esq.; P. N. Dunlap, Esq.

(57) ABSTRACT

An isolator comprising a hub, a pulley frictionally engaged with the hub through a bushing for instantaneous rotational movement, the bushing and hub having a coefficient of friction, a resilient member engaged between the pulley and the hub for transmitting a torque, and a locking member for retaining the pulley on the hub.

10 Claims, 6 Drawing Sheets

ISOLATOR WITH DAMPING

FIELD OF THE INVENTION

The invention relates to an isolator having a frictional damping mechanism to damp oscillations between the hub and pulley.

BACKGROUND OF THE INVENTION

Isolators in engine accessory belt drives provide a vibration isolation function by utilizing a resilient member between the pulley and hub that is attached to the rotor of the alternator. Since the pulley and hub are connected, the relative motion between these two members is restricted. The stiffness of the resilient member is chose such that the first mode of vibration of the belt drive system is less that the firing frequency of the engine during idling. Therefore, at idle the isolator attenuates the vibration of the pulley, reducing the influence of the pulley on the rotor. Because the rotor vibration is reduced, less torque is required to be transmitted by the pulley and therefore the peak belt tensions are reduced. As a result, there is less chance the tensioner spans will become tight, move the tensioner arm, and slacken the belt span ahead of the alternator in the belt movement direction. This reduces the possibility of belt chirp noises. Isolators are very effective during normal engine operation, but have limited functionality during start-up and shut-down. This is because the system passes through a resonance during start-up and shut down.

To address this problem, decouplers provide a one way clutching feature. During crankshaft pulley acceleration in the engine start-up and running phases, the pulley and hub are locked to each other and the device behaves as a solid pulley. However, during the deceleration phases, the hub can rotate past or "overrun" the pulley. This is useful because it prevents the rotor inertia from creating high tensions in the tensioner span, thereby, avoiding belt slip noise. The decoupler may require a small torque to develop before the device actually overruns. Since there is no connection between the pulley and hub in the overrun mode, the pulley can rotate unrestricted. Decouplers function well for engine start-up and shut down events but are only somewhat adequate during engine running.

Representative of the art is U.S. Pat. No. 5,139,463 which discloses a serpentine belt drive system for an automotive vehicle in which the sequence of driven assemblies includes an alternator assembly comprising a housing and an armature assembly mounted in the housing for rotation about an armature axis. A hub structure is carried by the armature assembly outwardly of the housing for rotation therewith about the armature axis. A coil spring is disposed in operative relation between the alternator pulley and the hub structure for transmitting the driven rotational movements of the alternator pulley by the serpentine belt to the hub structure such that the armature assembly is rotated in the same direction as the alternator pulley while being capable of instantaneous relative resilient rotational movements in opposite directions with respect to the alternator pulley during the driven rotational movement thereof.

What is needed is an isolator having a frictional damping mechanism to damp oscillations between the hub and pulley. The present invention meets this need.

SUMMARY OF THE INVENTION

The primary aspect of the invention is to provide an isolator having a frictional damping mechanism to damp oscillations between the hub and pulley.

Other aspects of the invention will be pointed out or made obvious by the following description of the invention and the accompanying drawings.

The invention comprises an isolator comprising a hub, a pulley frictionally engaged with the hub through a bushing for instantaneous rotational movement, the bushing and hub having a coefficient of friction, a resilient member engaged between the pulley and the hub for transmitting a torque, and a locking member for retaining the pulley on the hub.

BRIEF DESCRIPTION OF THE DRAWINGS

The accompanying drawings, which are incorporated in and form a part of the specification, illustrate preferred embodiments of the present invention, and together with a description, serve to explain the principles of the invention.

DETAILED DESCRIPTION OF THE PREFERRED EMBODIMENT

Figure 1:
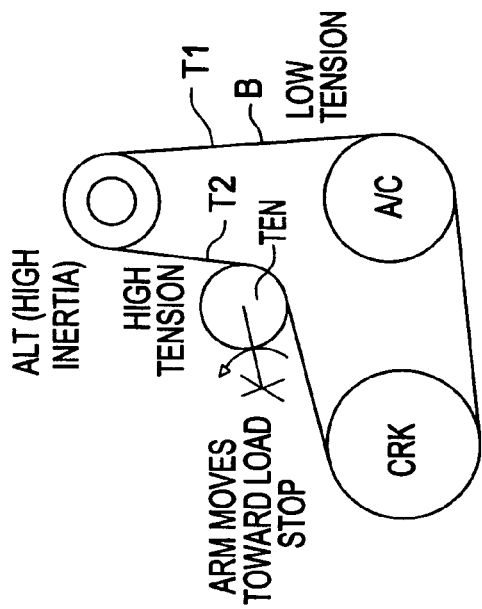
FIG. 1 is a chart showing belt drive system behavior during engine acceleration.
Figure 1A:
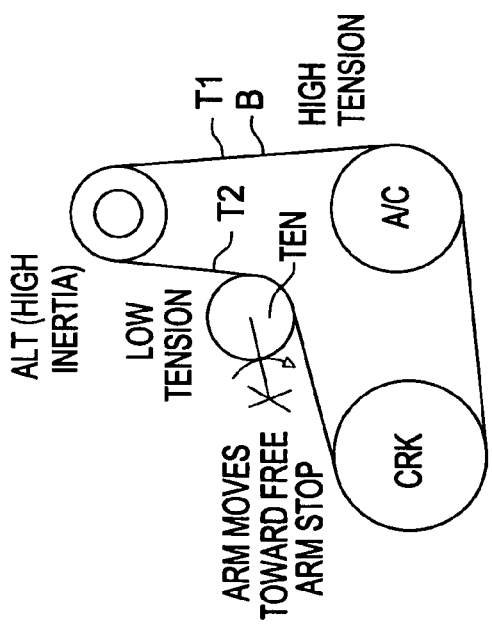

FIG. 1 is a chart showing belt drive system behavior during engine acceleration. During start-up the belt drive is subjected to torque impulses caused by the periodic firing of each cylinder. The periodic impulses cause instantaneous accelerations of the belt and thereby of the driven accessories. The impulses can also cause undesirable vibration of the belt.

FIG. 1 illustrates and engine belt drive system comprising a crankshaft pulley (CRK), and accessory such as an air conditioner compressor (A/C), and an alternator (ALT). A belt (B) is trained between each. A tensioner (TEN) maintains proper belt operating tension.

During portions of the start up phase when the engine is accelerating as indicated in FIG. 1 the belt spans (T1) following the alternator (ALT) experiences high tension since positive torque is needed to accelerate the alternator inertia. The high tension causes belt stretch and the increase in belt length is accumulated in the tensioner span (T2). This causes the tensioner arm (TEN) to move towards its free-arm stop (unloading). The tensioner maintains a controlled belt tension in the span (T2) before the alternator. In this condition the system rarely generates belt noise.

Figure 2:
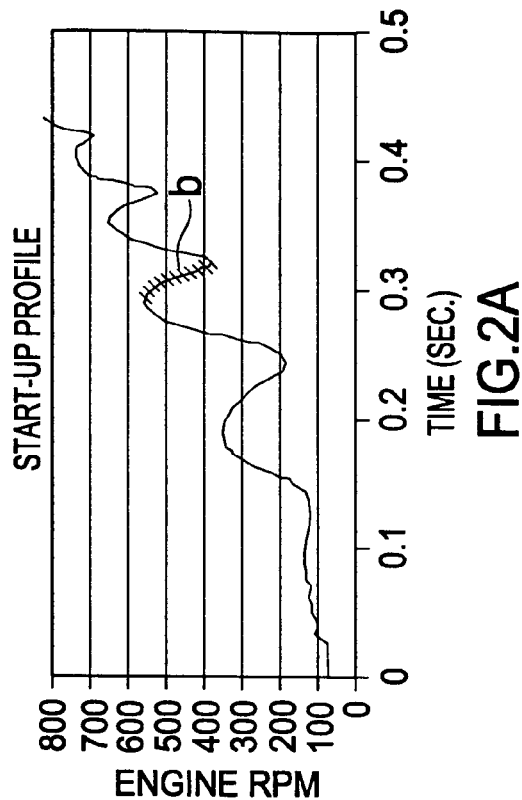
FIG. 2 is a chart showing belt drive system behavior during engine deceleration.
Figure 2A:
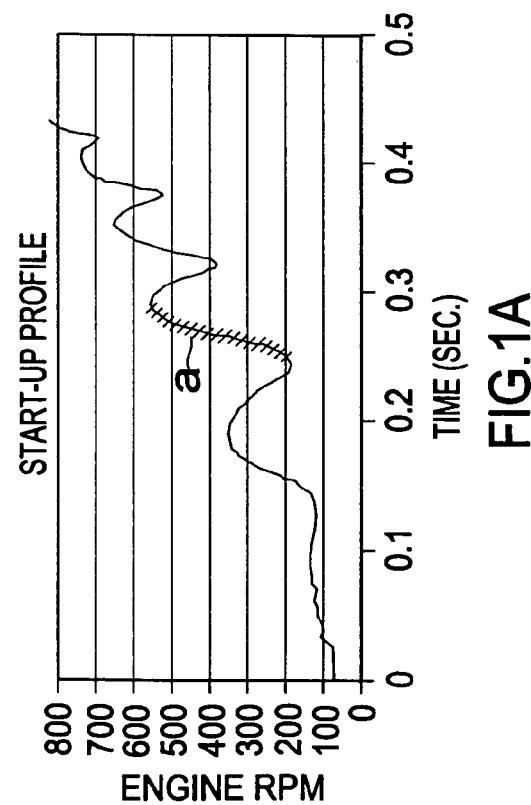

FIG. 2 is a chart showing belt drive system behavior during engine deceleration. During the phase when the engine is decelerating as shown in FIG. 2 the alternator inertia will tend to rotate at its current speed (Newton's first law of motion) and so the alternator will become the prime mover of the belt. This causes the normally slack span (T2) of belt (B) around the tensioner to become tight. If the belt tension is high enough to overcome the spring load of the tensioner TEN and damping in the tensioner, the tensioner arm will move towards its full load stop (away from the belt). This in effect decreases the drive length and causes the belt span (T1) to slacken and loose tension. When the tension drops below some critical value, the belt drive will suffer from belt chirp noises. To address this situation, devices such as alternator decoupler or isolator have been developed that replaces the prior art solid alternator pulley. Prior art decouplers allow the alternator pulley to rotate relative to the hub which in attached to the rotor of the alternator. The amount of relative motion is dependent on the particular device. Prior art alternator decouplers generally provide a one way clutching feature, during the crankshaft pulley acceleration in the start-up and running phases, the pulley and hub are locked to each other and the decoupler behaves as a solid pulley. However, during the deceleration phases, the hub can rotate past or overrun the pulley. This is useful because it prevents the alternator rotor inertia from creating high tensions in the tensioner span (T2), thereby, avoiding belt slip noise. The device may require a small torque to develop before the device actually overruns. Since there is no torque transmitting connection between the pulley and hub in the overrun mode, the hub can momentarily rotate unrestricted.

Figure 3:
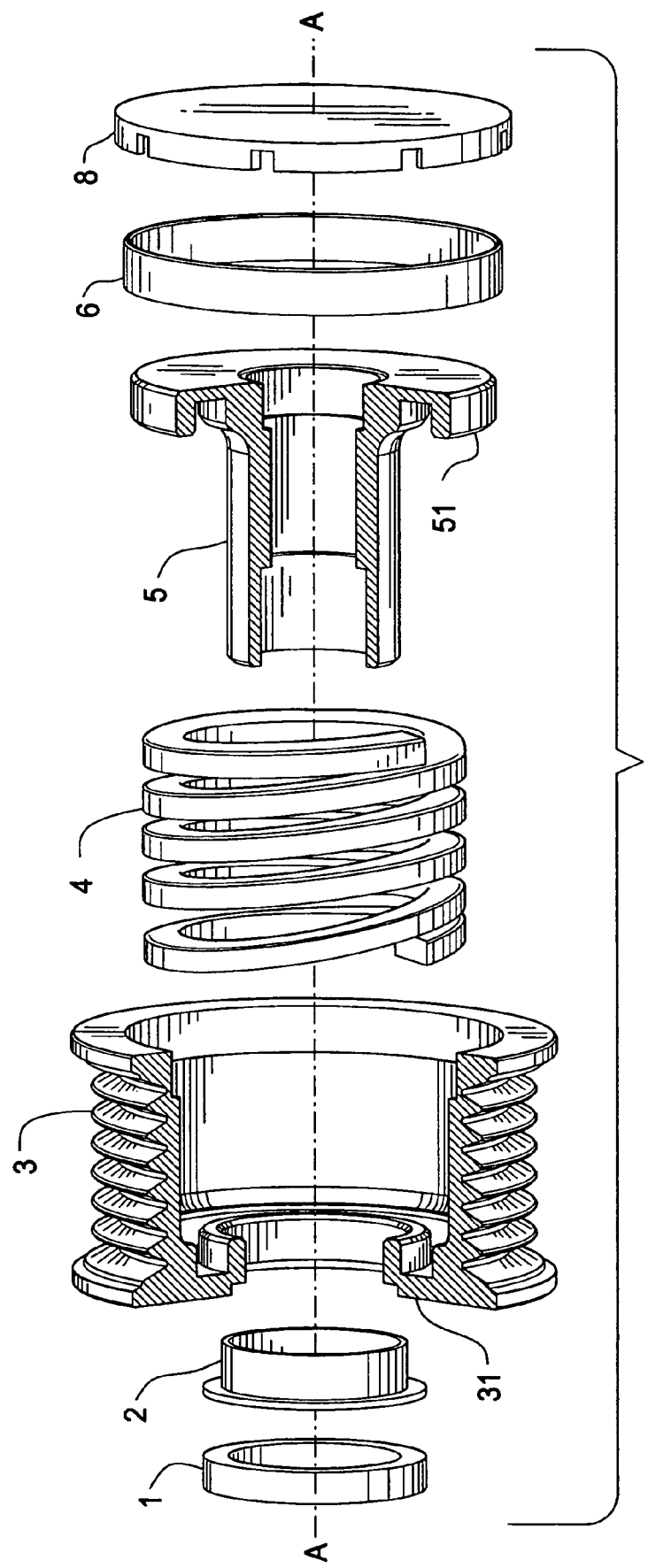
FIG. 3 is an exploded view of the inventive isolator.

FIG. 3 is an exploded view of the inventive isolator. The inventive isolator comprises a pulley 3, inner bushing 2, outer bushing 6, hub 5, torsional spring 4, hub cover 8, and locking ring 1 to keep the assembly together. Spring 4 is compressed between the flange 31 of the pulley and the flange 51 of the hub.

Since the pulley rotationally moves relative to the hub, a bearing surface is required to support hubload. In this design the inner 2 and outer 6 bushing provide the bearing function. In addition, bushings 2 and 6 provide damping between the pulley and hub. The amount of damping is related to the coefficient of friction of the mating surfaces.

As an example, Oiles Techmet B bushing on steel has a COF of 0.18. The spring rate for spring 4 is approximately 0.27 Nm/deg. The pulley diameter is approximately 56.5 mm. The numerical values are only offered as examples and are not intended to limit the breadth or scope of the invention.

Figure 4:
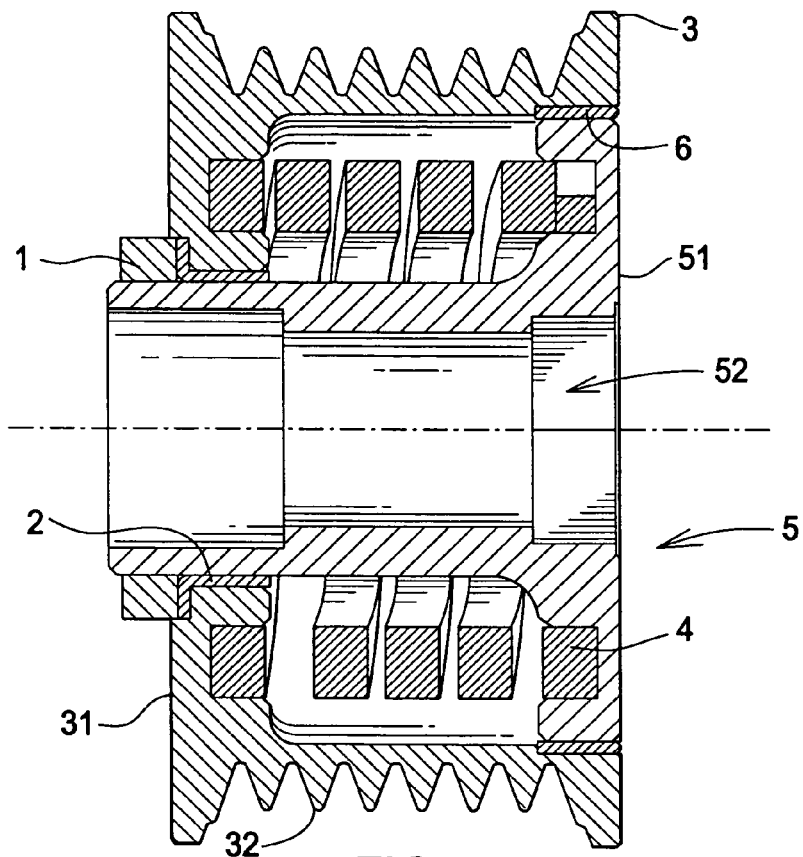
FIG. 4 is a cross-section view of the isolator in FIG. 3.

FIG. 4 is a cross-section view of the isolator in FIG. 3. Bore 52 receives an alternator shaft (not shown). Belt bearing surface 32 has a profile for engaging a multi-ribbed belt (not shown). Locking ring 1 is press fit on hub 5.

Figure 5A:
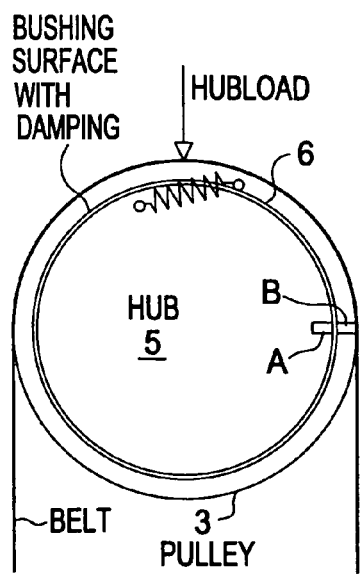
FIG. 5(a), 5(b), 5(c) is a sequential schematic showing relative movement of the hub and the pulley for the isolator.
Figure 5B:
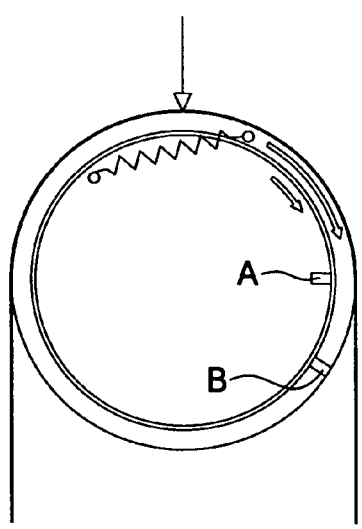
Figure 5C:
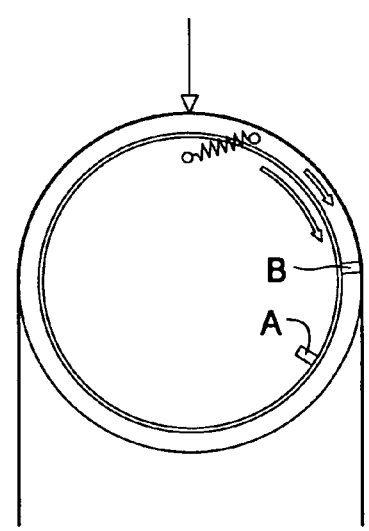

FIG. 5(a), 5(b), 5(c) is a sequential schematic showing relative movement of the hub and the pulley for the isolator. With regard to FIG. 5(a), when the engine is off, the pulley and hub will not be displaced relative to each other as indicated by the marks A and B adjacent to each other. Spring 4, shown schematically, is not deformed.

Upon engine start-up, pulley 3 will experience an instantaneous high acceleration rate causing it to momentarily move angularly ahead of the hub as indicated in FIG. 5(b) and as shown by the new relative positions of B angularly ahead of A in the CW direction. The torque transferred from the pulley to the hub will be the sum of the torque through the spring 4 and through the friction surface at the bushing 6. The amount of torque through the friction surface depends on the hubload and COF. "Hubload" is the vector for the belt tension acting on the hub.

During the engine/belt acceleration phase, the hubload can be relatively high (approx. 1200N) and the damping torque could be:

$$1200N*0.18*0.045/2=4.9\ Nm$$

(assume COF of 0.18 and bushing diameter of approximately 45 mm).

The torque that is transmitted through the spring together with the angular displacement of the pulley relative to the hub causes the spring to momentarily increase in potential energy. The torque energy that goes through the damping is dissipated as heat. If the damping was not present, all the torque will be transferred through the spring, causing a much larger buildup of potential energy in the spring.

The buildup of potential energy in the spring causes the hub to now accelerate in the CW direction, During the deceleration phase of the start up, the hub rotates pass the pulley in a CW direction as indicated by the new relative position of A angularly ahead of B in FIG. 5(c). The torque transmitted to the pulley from the hub will be the spring torque minus the damping torque. During this deceleration phase, the hubload is low (~400N) and the damping torque could be:

$$400N*0.18*0.045/2=1.6\ Nm$$

(assume COF of 0.18 and a bushing diameter of 45 mm).

Because the spring torque is reduced by the damping toque, there is less tightening of the tensioner span T2 and less potential for the tensioner arm to move towards the load stop causing slackening of the belt in other spans, thereby causing belt slip noises.

Figure 6:
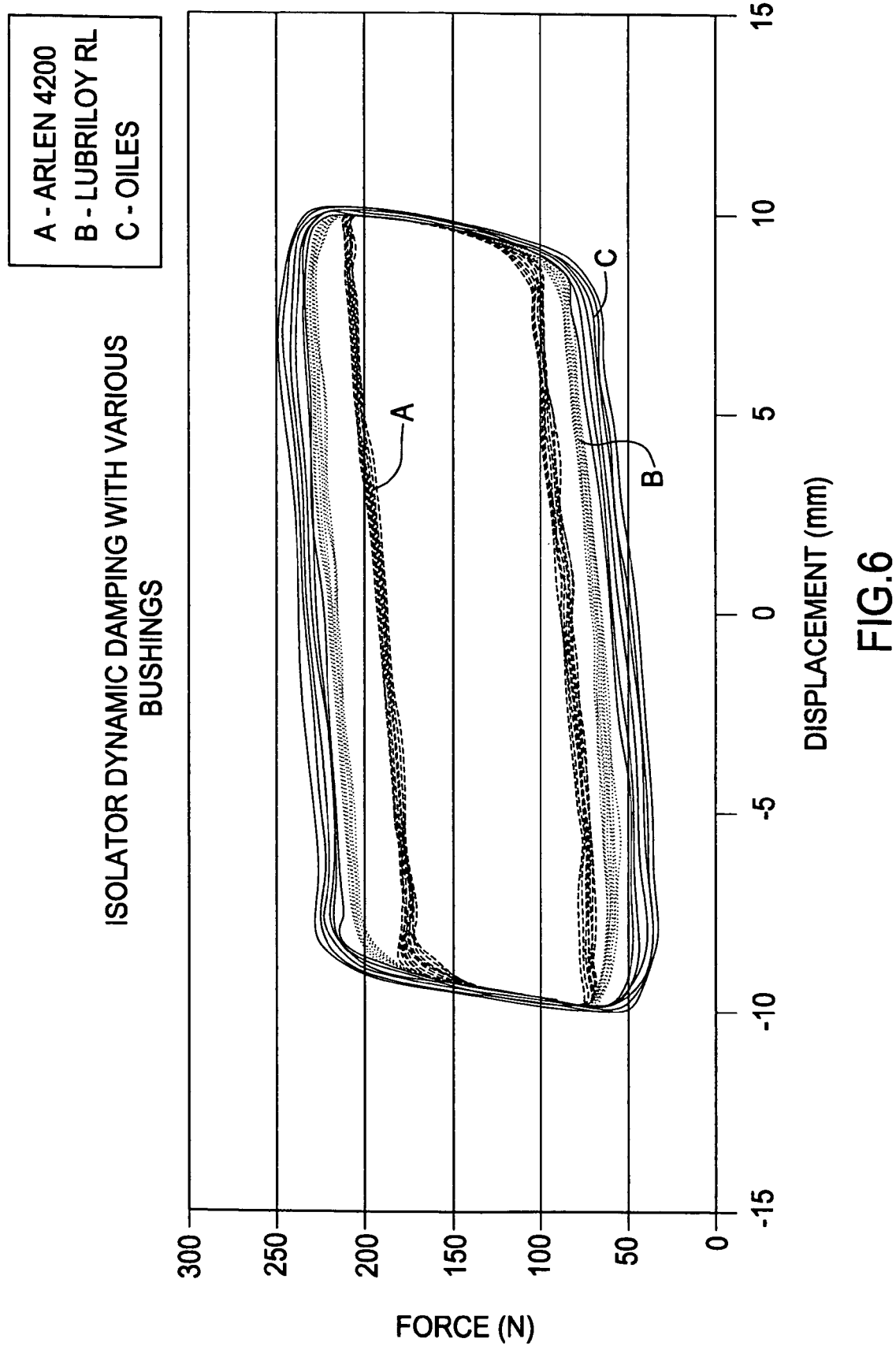
FIG. 6 is a chart showing dynamic damping measurement for the isolator using various bushing materials.

FIG. 6 is a chart showing dynamic damping measurement for the isolator using various bushing materials. Each bushing 2 and 6 could comprise the same material or have different materials in order to adjust the desired COF for a particular application. The hysteretic nature of the damping is demonstrated in the dynamic damping measurement for various bushing materials. The materials include Arlen 4200 (A), Lubriloy RL (B), and Oiles (C). The chart compares force in Newtons with relative displacement.

Figure 7:
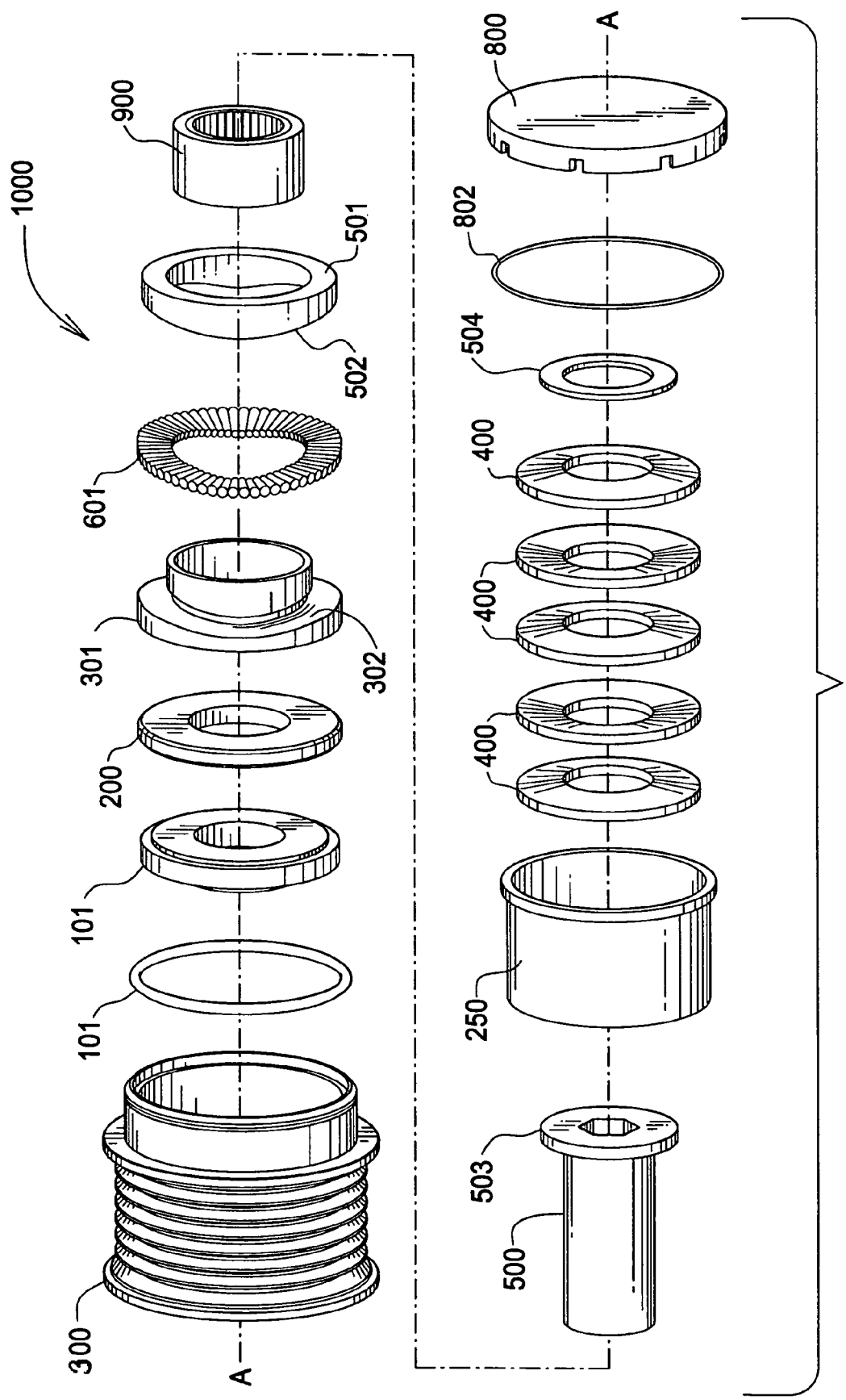
FIG. 7 is an exploded view of an alternate embodiment.
Figure 7A:
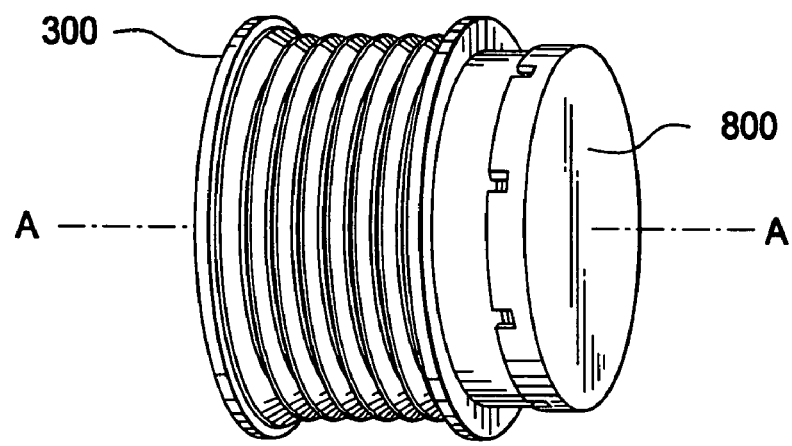

FIG. 7 is an exploded view of an alternate embodiment. In this alternate embodiment 1000, the resilient element 400 may comprise a polymer such as synthetic or natural rubber.

It may also be a damping mechanism system that comprises cooperating cams used to convert the rotational motion of the pulley relative to the hub into a linear motion of the cams that is parallel with the axis of rotation A-A. The linear motion acts on Belleville washers (or disc springs) to create the resilient damping mechanism.

More particularly, a cam member 301 is press fit into pulley 300. Cam member 301 comprises a cam surface 302. Cam surface 302 has a surface profile which approximates a sinusoidal form. Seal 101, seal 802 and dust cap 800 prevent debris from entering the isolator.

Cam member 501 comprises a cam surface 502. Cam surface 502 has a surface profile which approximates a sinusoidal form.

A roller bearing 601 is disposed between cam member 301 and cam member 501. Roller bearing 601 facilitates relative movement between cam members 301 and 501.

Springs 400 comprise Belleville washers. Washers 400 are compressed between flange 503 of hub 500 and cam member 501. Washers 400 may be installed in parallel or in series. Washers 400 are shown in series in FIG. 8. Disc springs may be substituted for Belleville washers. Flat steel washer 504 is disposed between springs 400 and flange 503 to prevent spring 400 from abrading flange 503.

Component 900 is a bushing or bearing and is disposed between cam member 301 and hub 500. Component 900 allows freedom of rotational movement of cam member 301 with respect to hub 500 while providing frictional damping between the two members. Bushing 900 may comprise any suitable material, including those described in FIG. 6, or may comprise a ball bearing.

Bore 505 engages an accessory shaft (not shown). Roller bearing 200 is engaged with the inner surface of pulley 300. The roller bearing 200 is disposed between the cam member 301 and the locking ring 100. Roller bearing 200 facilitates relative motion between cam member 301 and locking ring 100. Bushing 900 damps oscillatory movement of cam member 301 (and thereby the pulley 300) by frictional engagement with locking ring 100.

Bushing 250 is engaged with the inner surface of pulley 300. Bushing 250 slidingly engages cam member 501.

In operation, washers 400 are compressed between flange 503 and cam member 501. The cooperating profiles of surface 302 and 502 causes the isolator to have a position where the spring force is at a minimum. As a torque is applied to the pulley, the surfaces 302 and 503 rotate relative to each other causing linear movement along axis A-A due to the sinusoidal profiles. This causes springs 400 to be compressed between flange 503 and cam member 501. Compression of washers 400 increases the spring force between the pulley and hub.

Figure 8:
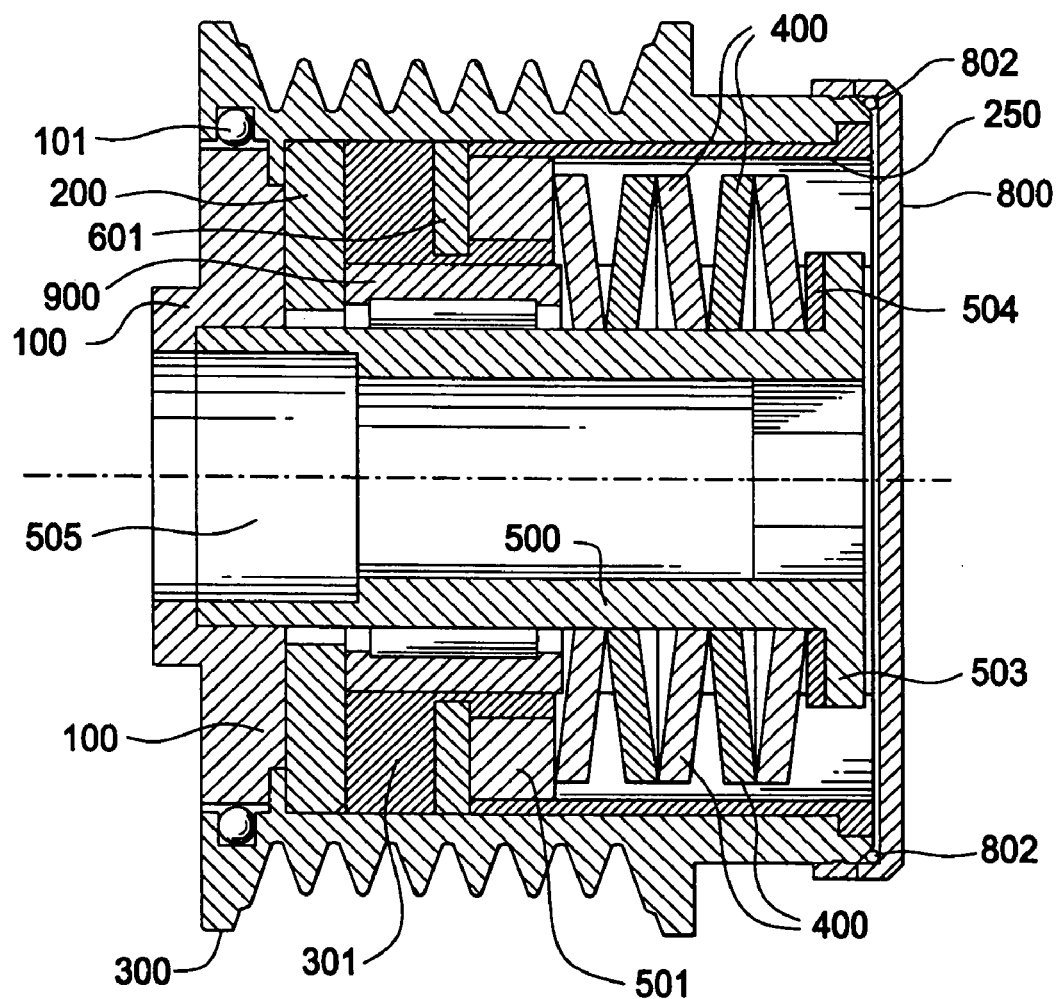
FIG. 8 is a cross-section view of the alternate embodiment in FIG. 7.

FIG. 8 is a cross-section view of the alternate embodiment in FIG. 7. The amount of damping created through the COF and the hubload should be such that the belt slip is restricted to 10% or less during start-up or shut down. The damping is useful during engine start up and shut down and the spring is useful during engine idling when it attenuates the pulley vibration and reduces the rotor motion.

Although a form of the invention has been described herein, it will be obvious to those skilled in the art that variations may be made in the construction and relation of parts without departing from the spirit and scope of the invention described herein.

We claim:

1. An isolator comprising:
   a hub;
   a pulley frictionally engaged with the hub through a bushing for instantaneous rotational movement, the bushing and hub having a coefficient of friction;
   a resilient member engaged between the pulley and the hub for transmitting a torque;
   a first cam member having a first cam surface, the first cam member fixed to the pulley;
   a second cam member having a second cam surface slidingly engaged with the first cam surface;
   the first cam member and the second cam member pressingly engaged between the resilient member and the hub; and
   a locking member for retaining the pulley on the hub.

2. The isolator as in claim 1, wherein the resilient member comprises a Belleville washer.

3. The isolator as in claim 1, wherein the resilient member comprises a torsional spring.

4. The isolator as in claim 1 further comprising a roller bearing disposed between the first cam surface and the second cam surface.

5. The isolator as in claim 1 further comprising a damping member disposed between the pulley and the hub for damping a pulley oscillation.

6. A belt drive system comprising:
   an engine crankshaft pulley;
   an accessory driven by a belt, the belt trained between the crankshaft pulley and an accessory pulley;
   an isolator engaged with the accessory pulley, the isolator comprising:
   a hub engaged to the accessory;
   the accessory pulley frictionally engaged with the hub through a bushing for instantaneous rational movement, the bushing and hub having a coefficient of friction;
   a resilient member engaged between the accessory pulley and the hub for transmitting a torque;
   a first cam member fixed to the accessory pulley;
   a second cam member slidingly engaged with the first cam member;
   the first cam member and the second cam member pressingly engaged between the resilient member and the hub; and
   a locking member for retaining the accessory pulley on the hub.

7. The isolator as in claim 6, wherein the resilient member comprises a Belleville washer.

8. The isolator as in claim 6, wherein the resilient member comprises a torsional spring.

9. The isolator as in claim 6 further comprising a roller bearing disposed between the first cam surface and the second cam surface.

10. The isolator as in claim 6 further comprising a damping member disposed between the accessory pulley and the hub for damping an accessory pulley oscillation.

* * * * *